United States Patent
Toyama et al.

(10) Patent No.: US 8,962,072 B2
(45) Date of Patent: Feb. 24, 2015

(54) PROCESS FOR PRODUCTION OF ADHESIVE OPTICAL FILM

(75) Inventors: Yuusuke Toyama, Ibaraki (JP); Atsushi Yasui, Ibaraki (JP); Tomoyuki Kimura, Ibaraki (JP); Masayuki Satake, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 13/823,492

(22) PCT Filed: Dec. 13, 2011

(86) PCT No.: PCT/JP2011/078774
§ 371 (c)(1),
(2), (4) Date: Mar. 14, 2013

(87) PCT Pub. No.: WO2012/086466
PCT Pub. Date: Jun. 28, 2012

(65) Prior Publication Data
US 2013/0171371 A1 Jul. 4, 2013

(30) Foreign Application Priority Data
Dec. 24, 2010 (JP) ................. 2010-288107

(51) Int. Cl.
*B05D 5/06* (2006.01)
*B05D 5/10* (2006.01)
*C09D 7/00* (2006.01)
*C09J 7/02* (2006.01)

(52) U.S. Cl.
CPC *B05D 5/10* (2013.01); *C09D 7/001* (2013.01); *C09J 7/0257* (2013.01); *C09J 2433/003* (2013.01); *C09J 2465/003* (2013.01)
USPC ........................................ 427/162

(58) Field of Classification Search
CPC .............. B05D 5/10; B05D 5/00; G02B 5/30; C09J 5/02; C09J 7/02; C09J 11/06; C09J 133/08; C09J 7/0257; C09D 7/001
USPC ........................................ 427/162
See application file for complete search history.

(56) References Cited

U.S. PATENT DOCUMENTS

| | | | |
|---|---|---|---|
| 2005/0073633 A1* | 4/2005 | Satake et al. .................. | 349/113 |
| 2006/0108050 A1* | 5/2006 | Satake et al. .................. | 156/101 |
| 2006/0188712 A1 | 8/2006 | Okada et al. | |
| 2008/0281038 A1* | 11/2008 | Takahashi et al. ............ | 524/602 |
| 2009/0123718 A1* | 5/2009 | Ogasawara et al. .......... | 428/215 |

FOREIGN PATENT DOCUMENTS

| | | |
|---|---|---|
| JP | 2004-78143 A | 3/2004 |
| JP | 2007-171892 A | 7/2007 |
| JP | 2007-248485 A | 9/2007 |
| JP | 2009-242786 A | 10/2009 |

OTHER PUBLICATIONS

Chinese Office Action dated Jul. 23, 2013, issued in corresponding Chinese Patent Application No. 201180039115.6, w/English translation.
International Search Report for PCT/JP2011/078774, mailing date of Mar. 13, 2012.
Notification of Transmittal of Copies of Translation of the International Preliminary Report on Patentabililty (Form PCT/IB/338) of International Application No. PCT/JP2011/078774 mailed Jul. 11, 2013 with Forms PCT/IB/373 and PCT/ISA/237.
Chinese Office Action dated Jan. 13, 2014, issued in corresponding Chinese Application No. 201180039115.6 with English Translation. (14 pages).

* cited by examiner

*Primary Examiner* — Elizabeth Burkhart
(74) *Attorney, Agent, or Firm* — Westerman, Hattori, Daniels & Adrian, LLP

(57) ABSTRACT

A method for production of an adhesive optical film comprises the step of forming an anchor layer by applying an anchor layer-forming coating liquid to the optical film to form a coating with a thickness of 20 μm or less before drying, wherein the anchor layer-forming coating liquid contains a mixed solvent composed mainly of water and an alcohol, and a binder resin, and by drying the coating under drying conditions satisfying both of the following requirements:

(1) the drying temperature T is between 40° C. and 70° C.; and
(2) the value (T×H) obtained by multiplying the drying temperature T (° C.) by the drying time H (seconds) satisfies the relation $400 \leq (T \times H) \leq 4{,}000$ to remove the mixed solvent.

5 Claims, No Drawings

PROCESS FOR PRODUCTION OF ADHESIVE OPTICAL FILM

TECHNICAL FIELD

The present invention relates to a method for production of an adhesive optical film including an optical film, an anchor layer, and a pressure-sensitive adhesive layer placed on at least one side of the optical film with the anchor layer interposed therebetween. Examples of the optical film include a polarizing plate, a retardation plate, an optical compensation film, a brightness enhancement film, a surface treatment film such as an anti-reflection film and the like, and a laminate of any combination thereof and the like.

BACKGROUND ART

Liquid crystal display devices, organic electroluminescence (EL) display devices and the like have an image-forming mechanism including polarizing elements as essential components. For example, therefore, in a liquid crystal display device, polarizing elements are essentially arranged on both sides of a liquid crystal cell, and generally, polarizing plates are attached as the polarizing elements. Besides polarizing plates, various optical elements for improving display quality have become to be used in display panels such as liquid crystal panels and organic EL panels. Front face plates are also used to protect image display devices such as liquid crystal display devices, organic EL display devices, CRTs, PDPs or the like to provide a high-grade appearance or a differentiated design. Examples of parts used in image display devices such as liquid crystal display devices and organic EL display devices or parts used together with image display devices, such as front face plates, include retardation plates for preventing discoloration, viewing angle-widening films for improving the viewing angle of liquid crystal displays, brightness enhancement films for increasing the contrast of displays, and surface treatment films such as hard-coat films for use in imparting scratch resistance to surfaces, antiglare treatment films for preventing glare on image display devices, and anti-reflection films such as anti-reflective films and low-reflective films. These films are generically called optical films.

When such optical films are bonded to a display panel such as a liquid crystal cell, an organic EL panel and the like, or bonded to a front face plate, a pressure-sensitive adhesive is generally used. In the process of bonding an optical film to a display panel such as a liquid crystal cell, an organic EL panel and the like, or to a front faceplate or bonding optical films together, a pressure-sensitive adhesive is generally used to bond the materials together so that optical loss can be reduced. In such a case, an adhesive optical film and a pressure-sensitive adhesive layer previously formed on one side of the optical film is generally used, because it has some advantages such as no need for a drying process to fix the optical film and the like.

Optical films are vulnerable to shrinkage or expansion under heating or humidifying conditions. If the adhesion between an optical film and a pressure-sensitive adhesive is low, the optical film can lift or peel from the pressure-sensitive adhesive layer. Particularly in in-vehicle applications such as car navigation systems, liquid crystal panels are required to have higher durability, and in such applications, optical films are exposed to high shrinkage stress and can more easily lift or peel. Specifically, for example, even if there is no problem in a reliability test performed at about 80° C. for TVs or the like, a problem such as lifting or peeling can easily occur in a reliability test performed at about 95° C. for in-vehicle products such as car navigation systems. After an adhesive optical film is bonded to a liquid crystal display, if necessary, the optical film is temporarily peeled off and then bonded again (subjected to reworking). In this process, if the adhesion between the optical film and the pressure-sensitive adhesive is low, the pressure-sensitive adhesive can remain on the surface of the liquid crystal display, so that a problem can occur in which reworking cannot be performed efficiently or in which if the edge of the adhesive optical film comes into contact with a worker or something adjacent to it in the process of cutting, feeding, or handling it, the pressure-sensitive adhesive can be chipped off of the edge portion, which can easily cause a display failure in the liquid crystal panel. To solve these problems, a technique for increasing adhesion between an optical film and a pressure-sensitive adhesive layer is performed, which includes applying an anchor layer to the optical film and then applying the pressure-sensitive adhesive thereto.

On the other hand, the pressure-sensitive adhesive layer is required not to cause the adhesive to form a defect in an endurance test, which is usually performed as an accelerated environmental test under heating and humidifying conditions or other conditions. Unfortunately, when an anchor layer is disposed between an optical film and a pressure-sensitive adhesive layer, there is a problem in that solvent cracking occurs on the anchor layer-coated surface side of the optical film during an endurance test. Particularly in a reliability test performed at about 95° C. for in-vehicle products such as car navigation systems, solvent cracking significantly occurs in some cases, even if no solvent cracking occurs in a reliability test performed at about 80° C. for TVs or the like.

Patent Document 1 listed below discloses an adhesive optical film, a pressure-sensitive adhesive layer, and an anchor layer interposed between the optical film and the pressure-sensitive adhesive layer, wherein the anchor layer is obtained by applying an anchor layer-forming coating liquid containing a polyamine compound and a mixed solvent of water and an alcohol, and by drying the coating liquid. Concerning such an adhesive optical film, however, the composition of the anchor layer-forming coating liquid and the drying conditions are not specifically studied for the purpose of solving the problem of solvent cracking that occurs on the anchor layer-coated surface side of the optical film during an endurance test.

Patent Document 2 listed below discloses an adhesive optical film, a pressure-sensitive adhesive layer, and an anchor layer disposed between the optical film and the pressure-sensitive adhesive layer, wherein the anchor layer is obtained by applying an anchor layer-forming coating liquid containing an oxazoline group-containing polymer and a mixed solvent of water and an alcohol, and by drying the coating liquid. Patent Document 2 also discloses a specific example in which the anchor layer-forming coating liquid is dried under the conditions of a drying temperature of 40° C. and a drying time of 120 seconds. Patent Document 3 listed below discloses an adhesive optical film, a pressure-sensitive adhesive layer, and an anchor layer disposed between the optical film and the pressure-sensitive adhesive layer, wherein the anchor layer is obtained by applying an anchor layer-forming coating liquid composed of an aqueous solution containing a polyurethane resin and a water-soluble polythiophene-based conductive polymer, and by drying the coating liquid. Patent Document 3 also discloses a specific example in which the anchor layer-forming coating liquid is dried under the conditions of a drying temperature of 80° C. and a drying time of 120 seconds. However, it has been found that these drying conditions are not enough to prevent the solvent cracking described above and there is room for improvement.

Patent Document 4 listed below discloses an adhesive optical film, a pressure-sensitive adhesive layer, and an anchor layer disposed between the optical film and the pressure-sensitive adhesive layer, wherein the anchor layer is obtained by applying an anchor layer-forming coating liquid containing ammonia and an aqueous dispersion-type polymer and by drying the coating liquid. Patent Document 4 also discloses a specific example in which the anchor layer-forming coating liquid is dried under the conditions of a drying temperature of 50° C. and a drying time of 60 seconds. However, if the content of ammonia in the anchor layer is high, for example, when a polarizing plate is used as the optical film, the polarizing properties of the polarizing plate can change in a high-temperature or high-humidity environment. This affects the optical properties and sometimes makes it impossible to achieve high durability in a high-temperature or high-humidity environment.

As described above, the conventional techniques provide no example in which attention is focused on the problem of solvent cracking that occurs on the anchor layer-coated surface side of the optical film, and to solve the problem, it is necessary to make a further study.

PRIOR ART DOCUMENTS

Patent Documents

Patent Document 1: JP-A-2004-078143
Patent Document 2: JP-A-2007-171892
Patent Document 3: JP-A-2009-242786
Patent Document 4: JP-A-2007-248485

SUMMARY OF THE INVENTION

Problems to be Solved by the Invention

It is an object of the present invention, which has been made in view of the above state of the art, to provide a method for production of a adhesive optical film that includes an optical film, an anchor layer, and a pressure-sensitive adhesive layer placed on at least one side of the optical film with the anchor layer interposed therebetween, and has good adhesion and also has high crack resistance at high temperature.

Means for Solving the Problems

As a result of earnest studies to solve the above problems, the present inventors have found that when a mixed solvent of a specific composition is used and when the drying conditions for removing the mixed solvent are optimized, solvent cracking can be effectively prevented on the anchor layer-coated surface side of an adhesive optical film. The present invention has been made as a result of the studies and has features described below to achieve the object.

That is to say, the present invention relates to a method for production of an adhesive optical film comprising an optical film, an anchor layer, and a pressure-sensitive adhesive layer placed on at least one side of the optical film with the anchor layer interposed therebetween, the method comprising the step of forming an anchor layer by applying an anchor layer-forming coating liquid to the optical film to form a coating with a thickness of 20 μm or less before drying, wherein the anchor layer-forming coating liquid contains a mixed solvent composed mainly of water and an alcohol, and a binder resin, and by drying the coating under drying conditions satisfying both of the following requirements:

(1) the drying temperature T is between 40° C. and 70° C.; and (2) the value (T×H) obtained by multiplying the drying temperature T (° C.) by the drying time H (seconds) satisfies the relation $$400 \leq (T \times H) \leq 4,000$$

to remove the mixed solvent.

In the method for production of an adhesive optical film, it is preferred that the alcohol is isopropyl alcohol and/or ethanol.

In the method for production of an adhesive optical film, it is preferred that there is a time period of at most 30 seconds between applying the anchor layer-forming coating liquid to the optical film and starting the drying.

In the method for production of an adhesive optical film, it is preferred that a surface of the optical film, on which the anchor layer is to be formed, is made of a norbornene resin or a (meth)acrylic resin.

The method for production of an adhesive optical film preferably comprises the step of subjecting a surface of the optical film, on which the anchor layer is to be formed, to a corona treatment or a plasma treatment, before the step of forming the anchor layer.

Effect of the Invention

In the method of the present invention for production of an adhesive optical film, the anchor layer-forming coating liquid contains a binder resin and a mixed solvent composed mainly of water and an alcohol. In particular, the use of the mixed solvent composed mainly of water and an alcohol makes it possible to improve adhesion between the optical film and the pressure-sensitive adhesive layer and to improve the coating appearance of the anchor layer. In addition, the anchor layer-forming coating liquid containing a mixed solvent composed mainly of water and an alcohol is dried under dying conditions satisfying both of the following requirements:

(1) the drying temperature T is between 40° C. and 70° C.; and (2) the value (T×H) obtained by multiplying the drying temperature T (° C.) by the drying time H (seconds) satisfies the relation $$400 \leq (T \times H) \leq 4,000,$$

so that solvent cracking is prevented on the anchor layer-coated surface side of the optical film. Specifically, the method of the present invention for producing an adhesive optical film makes it possible to produce an adhesive optical film that is prevented from suffering from solvent cracking even in a reliability test performed at about 95° C. for in-vehicle products such as car navigation systems.

MODE FOR CARRYING OUT THE INVENTION

The present invention is directed to a method for production of an adhesive optical film, an anchor layer, and a pressure-sensitive adhesive layer placed on at least one side of the optical film with the anchor layer interposed therebetween. In the adhesive optical film, the pressure-sensitive adhesive layer or layers may be provided on one or both sides of the optical film.

The pressure-sensitive adhesive layer may be formed using any appropriate type of pressure-sensitive adhesive. Examples of the pressure-sensitive adhesive include a rubber-based pressure-sensitive adhesive, an acryl-based pressure-sensitive adhesive, a silicone-based pressure-sensitive adhesive, a urethane-based pressure-sensitive adhesive, a vinyl alkyl ether-based pressure-sensitive adhesive, a polyvinyl alcohol-based pressure-sensitive adhesive, a polyvinylpyrrolidone-based pressure-sensitive adhesive, a polyacrylamide-based pressure-sensitive adhesive, a cellulose-based pressure-sensitive adhesive and the like.

Among these pressure-sensitive adhesives, those having a high level of optical transparency and weather resistance or heat resistance and exhibiting appropriate wettability and pressure-sensitive adhesive properties such as appropriate cohesiveness and tackiness are preferably used. An acryl-based pressure-sensitive adhesive is preferably used because it has such properties.

Such an acryl-based pressure-sensitive adhesive includes, as a base polymer, an acryl-based polymer having an alkyl (meth)acrylate monomer unit in its main skeleton. As used herein, the term "alkyl (meth)acrylate" means alkyl acrylate and/or alkyl methacrylate, and "(meth)" is used in the same meaning in the description. The alkyl (meth)acrylate used to form the main skeleton of the acryl-based polymer may have a straight or branched chain alkyl group of 1 to 20 carbon atoms. Examples of the alkyl (meth)acrylate include methyl (meth)acrylate, ethyl (meth)acrylate, propyl (meth)acrylate, butyl (meth)acrylate, 2-ethylhexyl (meth)acrylate, isooctyl (meth)acrylate, isononyl (meth)acrylate, isomyristyl (meth)acrylate, lauryl (meth)acrylate or the like. These may be used alone or in any combination thereof. The average carbon number of such alkyl groups is preferably from 3 to 9.

In order to improve tackiness or heat resistance, one or more copolymerizable monomers may be incorporated into the acryl-based polymer by copolymerization. Examples of such copolymerizable monomers include hydroxyl group-containing monomers such as 2-hydroxyethyl (meth)acrylate, 2-hydroxypropyl (meth)acrylate, 4-hydroxybutyl (meth) acrylate, 6-hydroxyhexyl (meth)acrylate, 8-hydroxyoctyl (meth)acrylate, 10-hydroxydecyl (meth)acrylate, 12-hydroxylauryl (meth)acrylate, (4-hydroxymethylcyclohexyl)-methyl acrylate and the like; carboxyl group-containing monomers such as (meth)acrylic acid, carboxyethyl (meth) acrylate, carboxypentyl (meth)acrylate, itaconic acid, maleic acid, fumaric acid, crotonic acid and the like; acid anhydride group-containing monomers such as maleic anhydride, itaconic anhydride and the like; caprolactone adducts of acrylic acid; sulfonic acid group-containing monomers such as styrenesulfonic acid, allylsulfonic acid, 2-(meth)acrylamido-2-methylpropanesulfonic acid, (meth)acrylamidopropanesulfonic acid, sulfopropyl (meth)acrylate, (meth)acryloyloxynaphthalenesulfonic acid and the like; phosphate group-containing monomers such as 2-hydroxyethylacryloyl phosphate and the like, and the like.

Examples of such monomers for modification also include (N-substituted) amide monomers such as (meth)acrylamide, N,N-dimethyl(meth)acrylamide, N-butyl(meth)acrylamide, N-methylol(meth)acrylamide, N-methylolpropane(meth) acrylamide and the like; alkylaminoalkyl (meth)acrylate monomers such as aminoethyl (meth)acrylate, N,N-dimethylaminoethyl (meth)acrylate, tert-butylaminoethyl (meth) acrylate and the like; alkoxyalkyl (meth)acrylate monomers such as methoxyethyl (meth)acrylate, ethoxyethyl (meth) acrylate and the like; succinimide monomers such as N-(meth)acryloyloxymethylenesuccinimide, N-(meth)acryloyl-6-oxyhexamethylenesuccinimide, N-(meth)acryloyl-8-oxyoctamethylenesuccinimide, N-acryloylmorpholine and the like; maleimide monomers such as N-cyclohexylmaleimide, N-isopropylmaleimide, N-laurylmaleimide, N-phenylmaleimide and the like; and itaconimide monomers such as N-methylitaconimide, N-ethylitaconimide, N-butylitaconimide, N-octylitaconimide, N-2-ethylhexylitaconimide, N-cyclohexylitaconimide, N-laurylitaconimide and the like, and the like.

Examples of modifying monomers that may also be used include vinyl monomers such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, N-vinylcaprolactam and the like; cyanoacrylate monomers such as acrylonitrile, methacrylonitrile and the like; epoxy group-containing acrylic monomers such as glycidyl (meth)acrylate and the like; glycol acrylate monomers such as polyethylene glycol (meth)acrylate, polypropylene glycol (meth)acrylate, methoxyethylene glycol (meth)acrylate, methoxypolypropylene glycol (meth) acrylate and the like; and acrylic ester monomers such as tetrahydrofurfuryl (meth)acrylate, fluoro(meth)acrylate, silicone (meth)acrylate, 2-methoxyethyl acrylate and the like, and the like.

Concerning the weight ratios of all constituent monomers, the alkyl (meth)acrylate should be a main component of the acryl-based polymer, and the content of the copolymerizable monomer used to form the acryl-based polymer is preferably, but not limited to, 0 to about 20%, more preferably about 0.1 to about 15%, even more preferably about 0.1 to about 10%, based on the total weight of all constituent monomers.

Among these copolymerizable monomers, hydroxyl group-containing monomers and carboxyl group-containing monomers are preferably used in view of tackiness or durability. These monomers can serve as a reactive site to a crosslinking agent. Hydroxyl group-containing monomers and carboxyl group-containing monomers are highly reactive with intermolecular crosslinking agents and thus are preferably used to improve the cohesiveness or heat resistance of the resulting pressure-sensitive adhesive layer.

When a hydroxyl group-containing monomer and a carboxyl group-containing monomer are added as copolymerizable monomers, the content of the carboxyl group-containing monomer is preferably from 0.1 to 10% by weight, and the content of the hydroxyl group-containing monomer is preferably from 0.01 to 2% by weight, while these copolymerizable monomers should be used at the content described above. The content of the carboxyl group-containing monomer is more preferably from 0.2 to 8% by weight, even more preferably from 0.6 to 6% by weight. The content of the hydroxyl group-containing monomer is more preferably from 0.03 to 1.5% by weight, even more preferably from 0.05 to 1% by weight.

While the average molecular weight of the acryl-based polymer is not particularly restricted, it preferably has a weight average molecular weight of about 300,000 to about 2,500,000. The acryl-based polymer may be produced by any of various known methods. For example, a radical polymerization method such as a bulk polymerization method, a solution polymerization method, a suspension polymerization method and the like may be appropriately selected. Any of various known initiators such as azo initiators and peroxide initiators may be used as a radical polymerization initiator. The reaction is generally performed at a temperature of about 50 to about 80° C. for a time period of 1 to 8 hours. Among these production methods, a solution polymerization method is preferred, in which ethyl acetate, toluene, or the like is usually used as a solvent for the acryl-based polymer. The solution usually has a concentration of about 20 to about 80% by weight.

The pressure-sensitive adhesive is preferably a pressure-sensitive adhesive composition containing a crosslinking agent. A polyfunctional compound may be added to the pressure-sensitive adhesive, and such a compound may be an organic crosslinking agent or a polyfunctional metal chelate. Examples of the organic crosslinking agent include an epoxy crosslinking agent, an isocyanate crosslinking agent, an imine crosslinking agent, a peroxide crosslinking agent or the like. These crosslinking agents may be used singly or in combination of two or more. The organic crosslinking agent is preferably an isocyanate crosslinking agent. The polyfunctional metal chelate may comprise a polyvalent metal and an organic compound that is covalently or coordinately bonded to the metal. Examples of the polyvalent metal atom include Al, Cr, Zr, Co, Cu, Fe, Ni, V, Zn, In, Ca, Mg, Mn, Y, Ce, Sr, Ba, Mo, La, Sn, Ti and the like. The organic compound has a covalent or coordinate bond-forming atom such as an oxygen atom and the like. Examples of the organic compound include an alkyl ester, an alcohol compound, a carboxylic acid compound, an ether compound, a ketone compound or the like.

In general, the blending ratio of the crosslinking agent to the base polymer such as the acryl-based polymer and the like is preferably, but not limited to, about 0.001-20 parts by weight, more preferably 0.01-15 parts by weight of the crosslinking agent (on a solid basis) to 100 parts by weight of the base polymer (on a solid basis). The crosslinking agent is preferably an isocyanate crosslinking agent. The amount of the isocyanate crosslinking agent is preferably from about 0.001 to about 2 parts by weight, more preferably from about 0.01 to about 1.5 parts by weight, based on 100 parts by weight of the base polymer (on a solid basis).

If necessary, the pressure-sensitive adhesive may further contain a tackifier, a plasticizer, a filler of glass fibers, glass beads, metal powder, or any other inorganic powder, a pigment, a colorant, a filler, an antioxidant, an ultraviolet absorbing agent, a silane coupling agent, or other various additives, as long as the object of the present invention is achieved. Fine particles may also be added to the pressure-sensitive adhesive so that a pressure-sensitive adhesive layer with light diffusion properties can be formed.

Conventionally known silane coupling agents may be used without restriction. Examples include epoxy group-containing silane coupling agents such as γ-glycidoxypropyltrimethoxysilane, γ-glycidoxypropyltriethoxysilane, γ-glycidoxypropylmethyldiethoxysilane, 2-(3,4-epoxycyclohexyl)ethyltrimethoxysilane and the like; amino group-containing silane coupling agents such as 3-aminopropyltrimethoxysilane, N-2-(aminoethyl)-3-aminopropylmethyldimethoxysilane, 3-triethoxysilyl-N-(1,3-dimethylbutylidene)propylamine and the like; (meth)acrylic group-containing silane coupling agents such as 3-acryloxypropyltrimethoxysilane, 3-methacryloxypropyltriethoxysilane and the like; and isocyanate group-containing silane coupling agents such as 3-isocyanatopropyltriethoxysilane and the like. Any silane coupling agent in the pressure-sensitive adhesive layer may promote solvent cracking on the anchor layer-coated surface side of the optical film. Thus, the content of the silane coupling agent (on a solid basis) is preferably as low as possible based on 100 parts by weight of the base polymer (on a solid basis). More specifically, the content of the silane coupling agent is preferably from 0 to about 3 parts by weight, more preferably from 0 to about 2 parts by weight, even more preferably from 0 to about 1 part by weight.

The method of the present invention for producing an adhesive optical film includes forming the pressure-sensitive adhesive layer on the optical film with an anchor layer interposed between the pressure-sensitive adhesive layer and the optical film. The anchor layer is formed by a process including applying an anchor layer-forming coating liquid to the optical film to form a coating with a thickness of 20 μm or less before drying, wherein the coating liquid contains a mixed solvent composed mainly of water and an alcohol, and a binder resin, and then drying the coating under drying conditions satisfying both of the following requirements:

(1) the drying temperature T is between 40° C. and 70° C.; and (2) the value (T×H) obtained by multiplying the drying temperature T (° C.) by the drying time H (seconds) satisfies the relation $$400 \leq (T \times H) \leq 4{,}000$$

to remove the mixed solvent.

The anchor layer-forming coating liquid contains a mixed solvent composed mainly of water and an alcohol. In view of preventing solvent cracking, the use of water is preferred to the use of an alcohol. However, a mixture of water and an alcohol must be used in view of the compatibility of the anchor layer-forming coating liquid, the wettability of the optical film by the coating liquid, the adhesion of the coating liquid to the optical film, and the coating appearance of the anchor layer. If the compatibility of the anchor layer-forming coating liquid (the compatibility between the binder resin and the mixed solvent) is low (so that an aggregate, cloudiness, or the like can be produced), a coating appearance trouble will be more likely to occur, although a certain amount of the produced aggregate can be removed by filtration through a filter during the application. The mixed solvent is more preferably composed of water and isopropyl alcohol and/or ethanol, even more preferably composed of water and isopropyl alcohol. Concerning the mixing ratio between water and an alcohol, the content of water in the mixed solvent is preferably from 10 to 90% by weight, more preferably from 20 to 80% by weight, in particular, preferably from 30 to 70% by weight.

If the content of a component other than water and the alcohol, such as ammonia, in the anchor layer-forming coating liquid is high, the properties of the optical film, such as the polarizing properties of a polarizing plate used as the optical film, can change in a high-temperature or high-humidity environment. This affects the optical properties, so that high durability against a high-temperature or high-humidity environment cannot be achieved in some cases. Thus, the mixed solvent (the solvent with which the binder resin is diluted) in the anchor layer-forming coating liquid must be composed mainly of water and an alcohol. More specifically, the total content of water and an alcohol in the mixed solvent should be 90% by weight or more. The total content of water and an alcohol in the mixed solvent is more preferably 95% by weight or more, even more preferably 99% by weight or more. Most preferably, water and an alcohol make up substantially 100% by weight of the mixed solvent.

The anchor layer-forming coating liquid may contain ammonia, which can improve the coating appearance or optical reliability of the anchor layer in some cases. In view of durability or prevention of solvent cracking, however, the ammonia content is preferably as low as possible. More specifically, the content of ammonia in the anchor layer-forming coating liquid is preferably less than 0.05 parts by weight, more preferably less than 0.03 parts by weight, based on 100 parts by weight of the binder resin (on a solid basis).

The binder resin may be of any type capable of forming a layer that can improve the anchoring strength of the pressure-sensitive adhesive. More specifically, a resin (polymer) having an organic reactive group may be used, such as an epoxy resin, an isocyanate resin, a polyurethane resin, a polyester resin, polymers having an amino group in the molecule, an ester urethane resin, or any of various acrylic resins having an oxazoline group or other groups, and the like. The content of the binder resin in the anchor layer-forming coating liquid is preferably from 0.01 to 3.0% by weight, more preferably from 0.03 to 2.0% by weight, even more preferably from 0.05 to 0.9% by weight.

The anchor layer-forming coating liquid may contain an optional additive. The optional additive may be a leveling agent, an anti-foaming agent, a thickener, an antioxidant, or the like. Among these additives, a leveling agent (for example, one having an acetylene skeleton) is preferred. In general, the content of any of these additives is preferably from 0.01 to 500 parts by weight, more preferably from 0.1 to 300 parts by weight, even more preferably from 1 to 100 parts by weight, based on 100 parts by weight of the binder resin (on a solid basis).

In the method of the present invention for producing an adhesive optical film, the anchor layer-forming coating liquid is applied to the optical film so as to form a coating with a thickness of 20 μm or less before drying. If the coating before drying is too thick (the amount of the applied anchor layer-forming coating liquid is too large), the solvent can easily affect the coating and promote cracking, which can be a cause of cracking. If the coating is too thin, the adhesion between the optical film and the pressure-sensitive adhesive can be insufficient, which can be a cause of degradation of durability. Thus, the coating preferably has a thickness of 2 to 17 μm, more preferably 4 to 13 μm. The coating thickness before drying can be calculated from the thickness of the anchor layer after drying and the content of the binder resin in the anchor layer-forming coating liquid. The anchor layer-forming coating liquid may be applied by any application method such as coating, dipping, spraying and the like.

In the method of the present invention for producing an adhesive optical film, the coating is dried under conditions satisfying both of the following requirements:

(1) the drying temperature T is between 40° C. and 70° C.; and (2) the value (T×H) obtained by multiplying the drying temperature T (° C.) by the drying time H (seconds) satisfies the relation $$400 \leq (T \times H) \leq 4,000$$

so that the mixed solvent is removed when the anchor layer is formed.

Concerning the drying temperature T requirement (1), drying as quickly as possible is effective in preventing solvent cracking on the anchor layer-coated surface side of the optical film, but a too high drying temperature T can facilitate the degradation of the optical film. On the other hand, if the drying temperature T is too low, insufficient drying may cause degradation of the coating appearance of the anchor layer or may cause solvent cracking. Thus, the drying temperature T must be between 40° C. and 70° C. The drying temperature T is preferably between 45° C. and 60° C.

Concerning the requirement (2), if the value (T×H) obtained by multiplying the drying temperature T (° C.) by the drying time H (seconds) is too large, degradation of the optical film can be undesirably promoted. If the value (T×H) is too small, insufficient drying may cause degradation of the coating appearance of the anchor layer or may cause solvent cracking. Thus, the relation $400 \leq (T \times H) \leq 4,000$ must be satisfied. The requirement is preferably $500 \leq (T \times H) \leq 2,900$, more preferably $500 \leq (T \times H) \leq 2,000$, in particular, preferably $600 \leq (T \times H) \leq 1,250$.

If the drying time H is too long, degradation of the optical film can be undesirably promoted, and if the drying time H is too short, insufficient drying may cause degradation of the coating appearance of the anchor layer or may cause solvent cracking. Thus, the drying time H is preferably between 5 and 100 seconds, more preferably between 5 and 70 seconds, even more preferably between 10 and 35 seconds.

In the method of the present invention for producing an adhesive optical film, if there is a long time between the application of the anchor layer-forming coating liquid to the optical film and the start of the drying under the conditions described above, the coating appearance of the anchor layer may degrade, and solvent cracking may be promoted on the anchor layer-coated surface side of the optical film. It is not clear what promotes solvent cracking when there is a long time between the application of the anchor layer-forming coating liquid and the start of the drying. It is, however, conceivable that solvent cracking may be caused by infiltration and diffusion of the mixed solvent from the anchor layer-forming coating liquid into the polymer of the optical film. Thus, the time from the application of the anchor layer-forming coating liquid to the start of the drying is preferably as short as possible. Specifically, it is preferably 30 seconds or less, more preferably 20 seconds or less, in particular, preferably 10 seconds or less. The lower limit of it is typically, but not limited to, about 1 second in view of workability or the like.

The thickness of the anchor layer after the drying (dry thickness) is preferably from 3 to 300 nm, more preferably from 5 to 180 nm, even more preferably from 11 to 90 nm. An anchor layer with a thickness of less than 3 nm may be not enough to ensure the anchoring between the optical film and the pressure-sensitive adhesive layer. On the other hand, an anchor layer with a thickness of more than 300 nm may be too thick to have sufficient strength, so that cohesive failure can easily occur in such an anchor layer and that sufficient anchoring cannot be achieved in some cases.

In general, when the surface of the optical film, on which the anchor layer is formed by applying the anchor layer-forming coating liquid, is made of norbornene resin or (meth) acrylic resin, particularly, norbornene resin, solvent cracking is more likely to occur in a reliability test at a high temperature (95° C. or higher). This may be because (1) the optical film has a glass transition temperature (Tg) close to the temperature during the test so that the optical film becomes brittle during the test and (2) large shrinkage stress is applied to the polarizing plate during the test. Thus, when the product is for use in in-vehicle applications, which are required to pass a reliability test at a high temperature (95° C. or higher), the anchor layer-forming coating liquid should be dried under sophisticated conditions in the process of forming the anchor layer. However, the use of the method of the present invention for producing an adhesive optical film enables effective production of an adhesive optical film with high crack resistance even when norbornene resin or (meth)acrylic resin is used to form the surface of the optical film, on which the anchor layer is formed.

In the method of the present invention for producing an adhesive optical film, the surface of the optical film on which the anchor layer is to be formed may be subjected to the step of performing a corona treatment or a plasma treatment before the step of forming the anchor layer. The corona treatment or the plasma treatment can further increase adhesion between the optical film and the pressure-sensitive adhesive layer.

After the anchor layer is formed on the optical film, the pressure-sensitive adhesive layer is formed on the anchor layer, so that an adhesive optical film can be obtained. Examples of the method for depositing the pressure-sensitive adhesive layer include, but are not limited to, a method including applying a pressure-sensitive adhesive solution to the anchor layer and drying the solution, and a method including forming a pressure-sensitive adhesive layer on a release sheet and transferring the pressure-sensitive adhesive layer onto the anchor layer. The application method to be used may be roller coating such as reverse coating, gravure coating and the like, spin coating, screen coating, fountain coating, dipping, spraying and the like. The pressure-sensitive adhesive layer preferably has a thickness of 2 to 150 μm, more preferably 2 to 100 μm, in particular, preferably 5 to 50 μm. If the pressure-sensitive adhesive layer is too thin, a problem such as insufficient adhesion to the anchor layer or peeling from a glass interface may easily occur. If it is too thick, a problem such as foaming of the pressure-sensitive adhesive may easily occur.

The material used to form the release sheet may be any appropriate thin material such as paper, a film of synthetic resin such as polyethylene, polypropylene, polyethylene terephthalate and the like, a rubber sheet, a paper sheet, a cloth, a nonwoven fabric, a net, a foam sheet, a metal foil, a laminate of any combination thereof, and the like. If necessary, the surface of the release sheet may be subjected to an adhesion-reducing release treatment to increase the releasability from the pressure-sensitive adhesive layer, such as a silicone treatment, a long-chain alkyl treatment, fluoridization and the like.

It will be understood that the ability to absorb ultraviolet light may be imparted to each layer of the adhesive optical film according to the present invention, such as the optical film or the pressure-sensitive adhesive layer, by a treatment with an ultraviolet absorbing agent such as a salicylic ester compound, a benzophenol compound, a benzotriazole compound, a cyanoacrylate compound, a nickel complex salt compound and the like.

For example, the optical film used in the adhesive optical film according to the present invention may be a polarizing plate. A polarizing plate including a polarizer and a transparent protective film or films provided on one or both sides of the polarizer is generally used.

Any of various polarizers may be used without restriction. For example, the polarizer may be a product produced by a process including adsorbing a dichroic material such as iodine or a dichroic dye to a hydrophilic polymer film such as a polyvinyl alcohol-based film, a partially-formalized polyvinyl alcohol-based film, a partially-saponified, ethylene-vinyl acetate copolymer-based film etc. and uniaxially stretching the film or may be a polyene-based oriented film such as a film of a dehydration product of polyvinyl alcohol or a dehydrochlorination product of polyvinyl chloride. In particular, a polarizer including a polyvinyl alcohol-based film and a dichroic material such as iodine is advantageous. The thickness of the polarizer is generally, but not limited to, about 3 to about 80 μm.

For example, a polarizer including a uniaxially-stretched polyvinyl alcohol-based film dyed with iodine may be produced by a process including immersing a polyvinyl alcohol film in an aqueous iodine solution to dye the film and stretching the film to 3 to 7 times the original length. If necessary, the polyvinyl alcohol-based film may be immersed in an aqueous solution of potassium iodide or the like optionally containing boric acid, zinc sulfate, zinc chloride, or the like. If necessary, the polyvinyl alcohol-based film may be further immersed in water for washing before it is dyed. If the polyvinyl alcohol-based film is washed with water, dirt and any anti-blocking agent can be cleaned from the surface of the polyvinyl alcohol-based film, and the polyvinyl alcohol-based film can also be allowed to swell so that unevenness such as uneven dyeing can be effectively prevented. The film may be stretched before, while, or after it is dyed with iodine. The film may also be stretched in an aqueous solution of boric acid, potassium iodide, or the like or in a water bath.

The material used to form the transparent protective film is thermoplastic resin with a high level of transparency, mechanical strength, thermal stability, water blocking properties, isotropy and/or the like. Examples of such thermoplastic resin include cellulose resin such as triacetylcellulose and the like, polyester resin, polyethersulfone resin, polysulfone resin, polycarbonate resin, polyamide resin, polyimide resin, polyolefin resin, (meth)acrylic resin, cyclic polyolefin resin (norbornene resin), polyarylate resin, polystyrene resin, polyvinyl alcohol resin, and any blend thereof. The transparent protective film may be bonded to one side of the polarizer with a pressure-sensitive adhesive layer. In this case, thermosetting or ultraviolet-curable resin such as (meth)acrylic, urethane, acrylic urethane, epoxy, or silicone resin may be used to form a transparent protective film on the other side. The transparent protective film may contain any one or more appropriate additives. Examples of such an additive include an ultraviolet absorbing agent, an antioxidant, a lubricant, a plasticizer, a release agent, an anti-discoloration agent, a flame retardant, a nucleating agent, an antistatic agent, a pigment, a colorant or the like. The content of the thermoplastic resin in the transparent protective film is preferably from 50 to 100% by weight, more preferably from 50 to 99% by weight, even more preferably from 60 to 98% by weight, in particular, preferably from 70 to 97% by weight. If the content of the thermoplastic resin in the transparent protective film is less than 50% by weight, high transparency and other properties inherent in the thermoplastic resin may be insufficiently exhibited.

The transparent protective film may also be the polymer film disclosed in JP-A-2001-343529 (WO01/37007), such as a film of a resin composition containing (A) a thermoplastic resin having a substituted and/or unsubstituted imide group in the side chain and (B) a thermoplastic resin having a substituted and/or unsubstituted phenyl and nitrile groups in the side chain. A specific example includes a film of a resin composition containing an alternating copolymer of isobutylene and N-methylmaleimide and an acrylonitrile-styrene copolymer. Films such as those produced by mixing and extrusion of the resin composition may be used. These films have a small retardation and a small photoelastic coefficient and thus can prevent polarizing plates from having defects such as strain-induced unevenness. They also have low water-vapor permeability and thus have high moisture resistance.

While the thickness of the transparent protective film may be determined as appropriate, it is generally from about 1 to about 500 μm in view of strength, workability such as handleability, thin layer formability, or the like. In particular, its thickness is preferably from 1 to 300 μm, more preferably from 5 to 200 μm. The transparent protective film with a thickness of 5 to 150 μm is particularly preferred.

When transparent protective films are provided on both sides of the polarizer, protective films made of the same polymer material or different polymer materials may be used on the front and back sides.

In the present invention, at least one selected from cellulose resin, polycarbonate resin, cyclic polyolefin resin, and (meth) acrylic resin is preferably used to form the transparent protective film.

Cellulose resin is an ester of cellulose and a fatty acid. Examples of such a cellulose ester resin include triacetylcellulose, diacetyl cellulose, tripropionyl cellulose, dipropionyl cellulose or the like. In particular, triacetylcellulose is preferred. Triacetylcellulose has many commercially available sources and is advantageous in view of easy availability and cost. Examples of commercially available products of triacetylcellulose include "UV-50", "UV-80", "SH-80", "TD-80U", "TD-TAC", and "UZ-TAC" (trade names) manufactured by Fujifilm Corporation, and "KC series" manufactured by KONICA MINOLTA, and the like. In general, these triacetylcellulose products have a thickness direction retardation (Rth) of about 60 nm or less, while having an in-plane retardation (Re) of almost zero.

For example, cellulose resin films with a relatively small thickness direction retardation can be obtained by processing any of the above cellulose resins. Examples of the processing method include a method that includes laminating a common cellulose-based film to a base film, such as a polyethylene terephthalate, polypropylene, or stainless steel film, coated with a solvent such as cyclopentanone or methyl ethyl ketone, drying the laminate by heating (for example, at 80 to 150° C. for about 3 to about 10 minutes), and then peeling off the base film; and a method that includes coating a common cellulose resin film with a solution of a norbornene resin, a (meth) acrylic resin or the like in a solvent such as cyclopentanone or methyl ethyl ketone, drying the coated film by heating (for example, at 80 to 150° C. for about 3 to about 10 minutes), and then peeling off the coating film.

The cellulose resin film with a relatively small thickness direction retardation to be used may be a fatty acid cellulose resin film with a controlled degree of fat substitution. Triacetylcellulose for general use has a degree of acetic acid substitution of about 2.8. Preferably, however, the degree of acetic acid substitution should be controlled to be from 1.8 to 2.7 so that the Rth can be reduced. The Rth can also be controlled to be low by adding a plasticizer such as dibutyl phthalate, p-toluenesulfonanilide, or acetyl triethyl citrate to the fatty acid-substituted cellulose resin. The plasticizer is preferably added in an amount of 40 parts by weight or less, more preferably 1 to 20 parts by weight, even more preferably 1 to 15 parts by weight, to 100 parts by weight of the fatty acid cellulose resin.

For example, the cyclic polyolefin resin is preferably a norbornene resin. Cyclic olefin resin is a generic name for resins produced by polymerization of cyclic olefin used as a polymerizable unit, and examples thereof include the resins disclosed in JP-A-01-240517, JP-A-03-14882, JP-A-03-122137 and the like. Specific examples thereof include ring-opened (co)polymers of cyclic olefins, addition polymers of cyclic olefins, copolymers (typically random copolymers) of cyclic olefins and α-olefins such as ethylene, propylene and the like, graft polymers produced by modification thereof with unsaturated carboxylic acids or derivatives thereof, and hydrides thereof. Examples of the cyclic olefin include norbornene monomers.

Cyclic polyolefin resins have various commercially available sources. Examples thereof include ZEONEX (trade name) and ZEONOR (trade name) manufactured by ZEON CORPORATION, ARTON (trade name) manufactured by JSR Corporation, TOPAS (trade name) manufactured by Ticona, and APEL (trade name) manufactured by Mitsui Chemicals, Inc.

The (meth)acrylic resin preferably has a glass transition temperature (Tg) of 115° C. or more, more preferably 120° C. or more, even more preferably 125° C. or more, in particular, preferably 130° C. or more. If the Tg is 115° C. or more, the resulting polarizing plate can have high durability. The upper limit to the Tg of the (meth)acrylic resin is preferably, but not limited to, 170° C. or less, in view of formability or the like. The (meth)acrylic resin can form a film with an in-plane retardation (Re) of almost zero and a thickness direction retardation (Rth) of almost zero.

Any appropriate (meth)acrylic resin may be used as long as the effects of the present invention are not impaired. Examples of such a (meth)acrylic resin include poly(meth) acrylate such as poly(methyl methacrylate), methyl methacrylate-(meth)acrylic acid copolymers, methyl methacrylate-(meth)acrylic ester copolymers, methyl methacrylate-acrylic ester-(meth)acrylic acid copolymers, methyl (meth) acrylate-styrene copolymers (such as MS resins), and alicyclic hydrocarbon group-containing polymers (such as methyl methacrylate-cyclohexyl methacrylate copolymers and methyl methacrylate-norbornyl (meth)acrylate copolymers). Poly(C1-6 alkyl (meth)acrylate) such as poly(methyl methacrylate) is preferred. A methyl methacrylate-based resin composed mainly of a methyl methacrylate unit (50 to 100% by weight, preferably 70 to 100% by weight) is more preferred.

Examples of the (meth)acrylic resin include ACRYPET VH and ACRYPET VRL20A each manufactured by MITSUBISHI RAYON CO., LTD., and the (meth)acrylic resins disclosed in JP-A-2004-70296 including (meth)acrylic resins having a ring structure in their molecule and high-Tg (meth) acrylic resins obtained by intramolecular crosslinking or intramolecular cyclization reaction.

As (meth)acrylic resins, lactone ring structure-containing (meth)acrylic resins may also be used. This is because they have high heat resistance and high transparency and also have high mechanical strength after biaxially stretched.

Examples of the lactone ring structure-containing (meth) acrylic reins include the lactone ring structure-containing (meth)acrylic reins disclosed in JP-A-2000-230016, JP-A-2001-151814, JP-A-2002-120326, JP-A-2002-254544, JP-A-2005-146084 or the like.

The lactone ring structure-containing (meth)acrylic reins preferably have a ring structure represented by the following general formula (Formula 1):

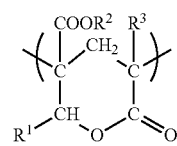

[Formula 1]

In the formula, $R^1$, $R^2$, and $R^3$ each independently represent a hydrogen atom or an organic residue of 1 to 20 carbon atoms. The organic residue may contain an oxygen atom(s).

The content of the lactone ring structure represented by the general formula (Formula 1) in the lactone ring structure-containing (meth)acrylic resin is preferably from 5 to 90% by weight, more preferably from 10 to 70% by weight, even more preferably from 10 to 60% by weight, in particular, preferably from 10 to 50% by weight. If the content of the lactone ring structure represented by the general formula (Formula 1) in the lactone ring structure-containing (meth) acrylic resin is less than 5% by weight, the resin may have an insufficient level of heat resistance, solvent resistance, or surface hardness. If the content of the lactone ring structure represented by the general formula (Formula 1) in the lactone ring structure-containing (meth)acrylic resin is more than 90% by weight, the resin may have low formability and workability.

The lactone ring structure-containing (meth)acrylic resin preferably has a mass average molecular weight (also referred to as "weight average molecular weight") of 1,000 to 2,000,000, more preferably 5,000 to 1,000,000, even more preferably 10,000 to 500,000, in particular, preferably 50,000 to 500,000. Mass average molecular weights outside the above range are not preferred in view of formability and workability.

The lactone ring structure-containing (meth)acrylic resin preferably has a Tg of 115° C. or more, more preferably 120° C. or more, even more preferably 125° C. or more, in particular, preferably 130° C. or more. For example, if a transparent protective film made of such a resin with a Tg of 115° C. or more is incorporated into a polarizing plate, the polarizing plate will have high durability. The upper limit to the Tg of the lactone ring structure-containing (meth)acrylic resin is preferably, but not limited to, 170° C. or less, in view of formability or other properties.

An injection-molded product of the lactone ring structure-containing (meth)acrylic resin preferably has a total light transmittance as high as possible, preferably 85% or more, more preferably 88% or more, even more preferably 90% or more, as measured by the method according to ASTM-D-1003. The total light transmittance is a measure of transparency, and a total light transmittance of less than 85% may mean lower transparency.

The transparent protective film to be used generally has an in-plane retardation of less than 40 nm and a thickness direction retardation of less than 80 nm. The in-plane retardation Re is expressed by the equation $Re=(nx-ny)\times d$. The thickness direction retardation Rth is expressed by the equation $Rth=(nx-nz)\times d$. The Nz coefficient is expressed by the equation $Nz=(nx-nz)/(nz-ny)$. In the equations, nx, ny, and nz represent the refractive indices of the film in the directions of its slow axis, fast axis, and thickness, respectively, and d (nm) represents the thickness of the film. The direction of the slow axis is a direction in which the in-plane refractive index of the film is maximum. The transparent protective film is preferably as colorless as possible. The transparent protective film to be used preferably has a retardation of −90 nm to +75 nm in its thickness direction. When the transparent protective film used has a retardation (Rth) of −90 nm to +75 nm in its thickness direction, transparent protective film-induced coloration of the polarizing plate (optical coloration) can be substantially avoided. The thickness direction retardation (Rth) is more preferably from −80 nm to +60 nm, in particular, preferably from −70 nm to +45 nm.

Alternatively, the transparent protective film to be used may be a retardation plate having an in-plane retardation of 40 nm or more and/or a thickness direction retardation of 80 nm or more. The in-plane retardation is generally controlled to be in the range of 40 to 200 nm, and the thickness direction retardation is generally controlled to be in the range of 80 to 300 nm. The use of the retardation plate as a transparent protective film makes it possible to reduce the thickness, because the retardation plate also functions as a transparent protective film.

Examples of the retardation plate include a birefringent film produced by uniaxially or biaxially stretching a polymer material, an oriented liquid crystal polymer film, and an oriented liquid crystal polymer layer supported on a film. While the thickness of the retardation plate is also not restricted, it is generally from about 20 to about 150 µm.

For example, the polymer material may be polyvinyl alcohol, polyvinyl butyral, poly(methyl vinyl ether), poly(hydroxyethyl acrylate), hydroxyethyl cellulose, hydroxypropyl cellulose, methylcellulose, polycarbonate, polyarylate, polysulfone, polyethylene terephthalate, polyethylene naphthalate, polyethersulfone, polyphenylene sulfide, polyphenylene oxide, polyallylsulfone, polyamide, polyimide, polyolefin, polyvinyl chloride, cellulose resin, cyclic polyolefin resin (norbornene resin), any of various types of binary or ternary copolymers thereof and graft copolymers thereof, any blend thereof or the like. Any of these polymer materials can be formed into an oriented product (a stretched film) by stretching or other processes.

Examples of the liquid crystal polymer include various main-chain or side-chain types having a conjugated linear atomic group (mesogen) that is introduced in the main or side chain of the polymer to impart liquid crystal molecular orientation. Examples of main chain type liquid crystal polymers include polymers whose structure has a mesogen group bounded through a flexibility-imparting spacer moiety, such as nematically ordered polyester liquid-crystalline polymers, discotic polymers, and cholesteric polymers. Examples of side-chain type liquid crystal polymers include polymers having a main chain skeleton of polysiloxane, polyacrylate, polymethacrylate, or polymalonate and a side chain having a mesogen moiety that comprises a nematic order-imparting para-substituted cyclic compound unit and is bonded through a spacer moiety including a conjugated atomic group. For example, any of these liquid crystal polymers may be applied by a process that includes spreading a solution of the liquid crystal polymer on a surface having undergone an alignment treatment, such as a rubbed surface of a thin film of polyimide, polyvinyl alcohol or the like formed on a glass plate, or an obliquely vapor-deposited silicon oxide surface formed on a glass plate, and heat-treating the solution.

The retardation plate may have any appropriate retardation depending on the intended purpose such as compensation for coloration, viewing angle, or the like associated with the birefringence of various wave plates or liquid crystal layers. Two or more retardation plates may also be laminated to provide controlled optical properties such as controlled retardation.

A retardation plate that satisfies the relation nx=ny >nz, nx>ny>nz, nx>ny=nz, nx>nz>ny, nz=nx>ny, nz>nx>ny, or nz>nx=ny is selected and used depending on various applications. Herein, ny=nz means not only that ny is completely equal to nz but also that ny is substantially equal to nz.

For example, when satisfying nx>ny>nz, the retardation plate to be used preferably has an in-plane retardation of 40 to 100 nm, a thickness direction retardation of 100 to 320 nm, and an Nz coefficient of 1.8 to 4.5. For example, when satisfying nx>ny=nz, the retardation plate (positive A plate) to be used preferably has an in-plane retardation of 100 to 200 nm. For example, when satisfying nz=nx>ny, the retardation plate (negative A plate) to be used preferably has an in-plane retardation of 100 to 200 nm. For example, when satisfying nx>nz>ny, the retardation plate to be used preferably has an in-plane retardation of 150 to 300 nm and an Nz coefficient of more than 0 to 0.7. Alternatively, the retardation plate to be used may satisfy nx=ny>nz, nz>nx>ny, or nz>nx=ny, as mentioned above.

The transparent protective film may be appropriately selected depending on the liquid crystal display to be produced therewith. For example, in the case of VA (Vertical Alignment, including MVA and PVA), at least one (on the cell side) of the transparent protective films of the polarizing plate should preferably has a retardation. Specifically, such a transparent protective film preferably has a retardation Re in the range of 0 to 240 nm and a retardation Rth in the range of 0 to 500 nm. In terms of three-dimensional refractive index, the relation nx>ny=nz, nx>ny>nz, nx>nz>ny, or nx=ny>nz (positive A plate, biaxial, negative C plate) is desirable. In the case of VA type, a combination of a positive A plate and a negative C plate or a single biaxial film is preferably used. When polarizing plates are used on the upper and lower sides of a liquid crystal cell, the transparent protective films on the upper and lower sides of the liquid crystal cell may each have a retardation, or one of the upper and lower transparent protective films may have a retardation.

For example, in the case of IPS (In-Plane Switching, including FFS), the transparent protective film of one of the polarizing plates may have or may not have a retardation. For example, transparent protective films with no retardation are desirably provided on both the upper and lower sides of a liquid crystal cell (on the cell sides). Alternatively, transparent protective films with a retardation are desirably provided on both upper and lower sides of a liquid crystal cell, or one of the upper and lower transparent protective films desirably has a retardation (for example, a biaxial film satisfying the relation nx>nz>ny may be provided on the upper side, and a film with no retardation may be provided on the lower side, or a positive A plate may be provided on the upper side, and a positive C plate may be provided on the lower side). When the transparent protective film has a retardation, it desirably has a retardation Re in the range of −500 to 500 nm and a retardation Rth in the range of −500 to 500 nm. In terms of three-dimensional refractive index, nx>ny=nz, nx>nz>ny, nz>nx=ny, or nz>nx>ny (positive A plate, biaxial, positive C plate) is desired.

The film with a retardation may be bonded to a separate transparent protective film with no retardation, so that the retardation function can be imparted to the transparent protective film.

Before coated with an adhesive, the transparent protective film may be subjected to a surface modification treatment for improving its bondability to the polarizer. Examples of such a treatment include a corona treatment, a plasma treatment, a flame treatment, an ozone treatment, a primer treatment, a glow treatment, a saponification treatment, and a treatment with a coupling agent. An antistatic layer may also be formed as needed.

The surface of the transparent protective film, opposite to its surface where the polarizer is to be bonded, may be subjected to hard coating, an antireflection treatment, an anti-sticking treatment, or a treatment for diffusion or antiglare purpose.

Hard coating is performed for the purpose of preventing the surface of the polarizing plate from being scratched and other purposes. For example, a hard coating can be formed by a method of making a cured film with a high level of hardness and smoothness on the surface of the transparent protective film from an appropriate ultraviolet-curable resin such as an acrylic and a silicone resin. An anti-reflection treatment is performed for the purpose of preventing reflection of external light on the polarizing plate surface, and it can be achieved by forming an anti-reflection film or the like according to conventional techniques. An anti-sticking treatment is performed for the purpose of preventing the film from sticking to an adjacent layer (e.g., a diffusion plate on the backlight side).

An antiglare treatment is performed for the purpose of preventing external light from reflecting on the surface of the polarizing plate and from inhibiting the view of light transmitted through the polarizing plate, and other purposes. An antiglare part can be formed by providing fine irregularities on the surface of the transparent protective film by any appropriate method such as a surface roughening method such as sand blasting or embossing or a method of mixing transparent fine particles. For example, the fine particles, which are used to form the surface fine irregularities, may be optionally-conductive inorganic fine particles of silica, alumina, titania, zirconia, tin oxide, indium oxide, cadmium oxide, antimony oxide, or the like with an average particle size of 0.5 to 20 μm, or may be transparent fine particles such as organic fine particles of a crosslinked or uncrosslinked polymer or the like with an average particle size of 0.5 to 20 μm. The surface fine irregularities are generally formed using about 2 to about 70 parts by weight of the fine particles, preferably 5 to 50 parts by weight of the fine particles, based on 100 parts by weight of the transparent resin used to form the surface fine irregularities. The antiglare layer may also serve as a diffusion layer (with a viewing angle-widening function or the like) to diffuse light being transmitted through the polarizing plate and to widen the viewing angle.

The anti-reflection layer, the anti-sticking layer, the diffusion layer, the antiglare layer, or the like may be provided in the transparent protective film itself, or may be provided as another optical layer independent from the transparent protective film.

The polarizer and the transparent protective film may be bonded together with an adhesive. Examples of such an adhesive include isocyanate adhesives, polyvinyl alcohol-based adhesives, gelatin-based adhesives, vinyl adhesives, latex adhesives, and aqueous polyester adhesives. The adhesive is generally used in the form of an aqueous adhesive solution, which generally has a solids content of 0.5 to 60% by weight. Besides the above, ultraviolet-curable adhesives, electron beam-curable adhesives, or the like may also be used to bond the polarizer and the transparent protective film together. Electron beam-curable adhesives for polarizing plates exhibit good tackiness to the various transparent protective films described above. The adhesive for use in the present invention may also contain a metal compound filler.

Examples of the optical film also include a reflector, a transflector, a retardation plate (including a wavelength plate such as a half or quarter wavelength plate), a visual compensation film, a brightness enhancement film, a surface treatment film, and any other optical layer that can be used to form a liquid crystal display device or the like. These optical components may be used alone as the optical film, or one or more layers of any of these optical components may be used with the polarizing film to form a laminate for practical use.

The surface treatment film may also be provided on and bonded to a front face plate. Examples of the surface treatment film include a hard-coat film for use in imparting scratch resistance to the surface, an antiglare treatment film for preventing glare on image display devices, and an anti-reflection film such as an anti-reflective film or a low-reflective film, etc. The front face plate is provided on and bonded to the surface of an image display device such as a liquid crystal display device, an organic EL display device, a CRT, or a PDP to protect the image display device or to provide a high-grade appearance or a differentiated design. The front face plate is also used as a support for a λ/4 plate in a 3D-TV. In a liquid crystal display device, for example, the front face plate is provided above a polarizing plate on the viewer side. When the pressure-sensitive adhesive layer according to the present invention is used, the same effect can be produced using a plastic base material such as a polycarbonate or poly(methyl methacrylate) base material for the front face plate, as well as using a glass base material.

The optical film including a laminate of the polarizing plate and the optical layer may be formed by a method of stacking them one by one in the process of manufacturing a liquid crystal display or the like. However, an optical film formed by previous lamination has the advantage that it can facilitate the process of manufacturing a liquid crystal display or the like, because it has stable quality and good assembling workability. In the lamination, any appropriate bonding means such as a pressure-sensitive adhesive layer may be used. When the polarizing plate and any other optical layer are bonded together, their optical axes may be each aligned at an appropriate angle, depending on the desired retardation properties or other desired properties.

The adhesive optical film according to the present invention is preferably used to form various image display devices such as liquid crystal display devices. Liquid crystal display devices may be formed according to conventional techniques. Specifically, a liquid crystal display device may be typically formed using any conventional technique including properly assembling a display panel such as a liquid crystal cell, an adhesive optical film, and optional components such as lighting system components, and incorporating a driving circuit, except that the adhesive optical film used is according to the present invention. The liquid crystal cell to be used may also be of any type such as TN type, STN type, π type, VA type, or IPS type.

Any desired liquid crystal display device may be formed, such as a liquid crystal display device including a display panel such as a liquid crystal cell and the adhesive optical film or films placed on one or both sides of the display panel or a liquid crystal display device further including a backlight or a reflector in a lighting system. In such a case, the optical film or films according to the present invention may be placed on one or both sides of a display panel such as a liquid crystal cell. When the optical films are provided on both sides, they may be the same or different. The process of forming a liquid crystal display device may also include placing an appropriate component such as a diffusion plate, an antiglare layer, an anti-reflection film, a protective plate, a prism array, a lens array sheet, a light diffusion plate, or a backlight in one or more layers at an appropriate position or positions.

Next, an organic electroluminescence device (organic EL display device or OLED) will be described. An organic EL display device generally includes a transparent substrate and a light-emitting element (an organic electroluminescence light-emitting element) that is formed on the substrate by stacking a transparent electrode, an organic light-emitting layer, and a metal electrode in this order. In this structure, the organic light-emitting layer is a laminate of different organic thin films. Concerning such a laminate, various combinations are known, such as a laminate of a hole injection layer comprising a triphenylamine derivative or the like and a light-emitting layer comprising a fluorescent organic solid material such as anthracene, a laminate of such a light-emitting layer and an electron injection layer comprising a perylene derivative or the like, and a laminate of the hole injection layer, the light-emitting layer, and the electron injection layer.

The organic EL display device emits light based on the mechanism that holes and electrons are injected into the organic light-emitting layer when a voltage is applied between the transparent electrode and the metal electrode, and the energy generated by the recombination of the holes and the electrons excites the fluorescent substance, so that light is emitted when the excited fluorescent substance goes back to the ground state. The mechanism of the recombination during the process is similar to that in common diodes. As expected from this feature, current and emission intensity exhibit strong nonlinearity accompanied by rectification with respect to applied voltages.

In the organic EL display, at least one of the electrodes must be transparent for the output of the emission from the organic light-emitting layer, and a transparent electrode made of a transparent electrical conductor such as indium tin oxide (ITO) is generally used as an anode. On the other hand, to facilitate the electron injection and increase the luminous efficiency, it is important to use a low-work-function substance for the cathode, and an electrode of a metal such as Mg—Ag or Al—Li is generally used.

In the organic EL display device with such a configuration, the organic light-emitting layer is formed of a very thin film with a thickness of about 10 nm. Thus, light is almost entirely transmitted through the organic light-emitting layer, as well as through the transparent electrode. In the off-state, therefore, light incident on the surface of the transparent substrate is transmitted through the transparent electrode and the organic light-emitting layer and reflected from the metal electrode to return to and exit from the surface of the transparent substrate, so that the screen of the organic EL display looks like a mirror surface when it is viewed from the outside.

An organic EL display device including an organic electroluminescence light-emitting element comprising an organic light-emitting layer for emitting light upon voltage application, a transparent electrode provided on the front side of the organic light-emitting layer, and a metal electrode provided on the back side of the organic light-emitting layer may also include a polarizing plate provided on the front side of the transparent electrode and a retardation plate provided between the transparent electrode and the polarizing plate.

The retardation plate and the polarizing plate act to polarize light that enters from the outside and is reflected from the metal electrode. Thus, their polarization action is effective in preventing the mirror surface of the metal electrode from being visible from the outside. Specifically, the retardation plate may include a quarter wavelength plate, and the angle between the polarization directions of the polarizing plate and the retardation plate may be set at π/4, so that the mirror surface of the metal electrode can be completely shielded.

Of external light incident on the organic EL display, therefore, only a linearly polarized light component is transmitted by the polarizing plate. The linearly polarized light is generally turned into elliptically polarized light by the retardation plate. Particularly when the retardation plate is a quarter wavelength plate and when the angle between the polarization directions of the polarizing plate and the retardation plate is π/4, the linearly polarized light is turned into circularly polarized light.

The circularly polarized light is transmitted through the transparent substrate, the transparent electrode, and the organic thin film, reflected from the metal electrode, transmitted through the organic thin film, the transparent electrode, and the transparent substrate again, and turned into linearly polarized light again by the retardation plate. The linearly polarized light has a polarization direction orthogonal to that of the polarizing plate and thus cannot pass through the polarizing plate. As a result, the mirror surface of the metal electrode can be completely shielded.

EXAMPLES

Hereinafter, the present invention is more specifically described with reference to the examples, which, however, are not intended to limit the present invention. In each example, "parts" and "%" are all by weight.

Example 1

(Preparation of Optical Film (Polarizing Plate)

An 80 µm-thick polyvinyl alcohol film was stretched to 3 times between rollers different in velocity ratio, while it was dyed in a 0.3% iodine solution at 30° C. for 1 minute. The film was then stretched to a total stretch ratio of 6 times, while it was immersed in an aqueous solution containing 4% boric acid and 10% potassium iodide at 60° C. for 0.5 minutes.

Subsequently, the film was cleaned by immersion in an aqueous solution containing 1.5% potassium iodide at 30° C. for 10 seconds, and then dried at 50° C. for 4 minutes to give a polarizer. A 40 µm-thick triacetylcellulose film (KC4UY (trade name) manufactured by KONICA MINOLTA) was bonded to the viewer side of the polarizer with a polyvinyl alcohol-based adhesive. A retardation plate made of a 33 µm-thick norbornene resin film (ZEONOR FILM ZD12 (trade name) manufactured by ZEON CORPORATION) was bonded as a transparent protective film to the surface of the polarizer on the side where a pressure-sensitive adhesive was to be applied, so that a polarizing plate was obtained.

(Preparation of Pressure-Sensitive Adhesive)

To a reaction vessel equipped with a condenser tube, a nitrogen-introducing tube, a thermometer, and a stirrer were added 94.9 parts of butyl acrylate, 5 parts of acrylic acid, 0.1 part of 2-hydroxyethyl acrylate, and 0.3 part of dibenzoyl peroxide (NYPER BMT40 (SV) manufactured by NOF CORPORATION) (based on 100 parts of the solids of the monomers) together with ethyl acetate. Under a nitrogen gas stream, the mixture was allowed to react at 60° C. for 7 hours. Ethyl acetate was then added to the reaction liquid, so that a polymer solution A containing an acryl-based polymer with a weight average molecular weight of 2,200,000 was obtained (30% by weight in solid concentration). Based on 100 parts of the solid in the acryl-based polymer solution, 0.6 part of trimethylolpropane tolylene diisocyanate (CORONATE L manufactured by Nippon Polyurethane Industry Co., Ltd.) and 0.075 part of γ-glycidoxypropylmethoxysilane (KBM-403 manufactured by Shin-Etsu Chemical Co., Ltd.) were added to the solution, so that an acryl-based pressure-sensitive adhesive solution was obtained.

(Preparation of Anchor Layer-Forming Coating Liquid)

A solution (Denatron P521-AC (trade name) manufactured by Nagase ChemteX Corporation) containing a urethane polymer and a thiophene polymer was diluted with a water/isopropyl alcohol (65:35 in volume ratio) mixture solution to a solid concentration of 0.6% by weight. The prepared solution was applied to the retardation plate (ZEONOR FILM ZD12) of the polarizing plate with a Mayer bar #5, and 5 seconds were allowed to elapse before the polarizing plate was placed in a drying oven (before drying was started). Subsequently, the applied solution was dried at 50° C. for 25 seconds to form a 70 nm-thick anchor coating layer. The thickness of the coating before the drying was about 12 µm, which was calculated from the thickness of the dried coating. The process was performed in the atmosphere at 23° C. and 55% RH. When a Mayer bar is used for application, the thickness of the coating before drying is substantially equal to the clearance of the Mayer bar. Thus, the thickness of the coating before drying can be adjusted, as desired, to a certain extent by changing the Mayer bar number. Table 1 shows each Mayer bar number and the corresponding clearance.

TABLE 1

| Mayer bar number | Clearance [µm] |
|---|---|
| #1 | 2 |
| #2 | 5 |
| #5 | 12 |
| #7 | 17 |
| #8 | 20 |
| #11 | 28 |

(Preparation of Adhesive Optical Film)

The pressure-sensitive adhesive solution was uniformly applied to the surface of a silicone release agent-treated polyethylene terephthalate film (backing) with a fountain coater, and dried for 2 minutes in an air circulation-type thermostatic oven at 155° C., so that a 20 µm-thick pressure-sensitive adhesive layer was formed on the surface of the backing. Subsequently, the pressure-sensitive adhesive layer-coated separator was bonded to the anchor layer-carrying optical film so that an adhesive optical film was obtained.

Examples 2-21 and 23-27 and Comparative Examples 1-5 and 7-15

Adhesive optical films were each prepared as in Example 1, except that the retardation plates shown in Tables 2 and 3 were each used instead of the retardation plate (ZEONOR FILM ZD12) for the optical film (polarizing plate) on the side where the anchor layer was to be formed.

Example 22 and Comparative Example 7

Adhesive optical films were each prepared as in Example 1, except that a pressure-sensitive adhesive layer (20 µm) was formed using the pressure-sensitive adhesive solution on the retardation plate (acryl-based resin film) of the acrylic polarizing plate used in Example 23, an optical film (backing) made of cyclic polyolefin resin (norbornene resin) (manufactured by JSR Corporation) was then placed as a retardation plate on the pressure-sensitive adhesive layer, and the anchor layer was formed on the retardation plate (ARTON).

In Tables 2 and 3, "Backing" indicates the retardation plate on the side where the anchor layer was to be formed, and "Dry treatment" indicates the type of the treatment performed on the surface of the backing on the side where the anchor layer was to be formed. In Tables 2 and 3, "Acryl" represents an optical film made of lactone-modified acrylic resin, "TAC" represents an optical film made of saponified triacetylcellulose (manufactured by KONICA MINOLTA), "IPA" represents isopropyl alcohol, "EA" represents ethanol, "MA" represents methanol, "EPOCROS WS-700" represents an oxazoline group-containing acryl-based polymer (manufactured by NIPPON SHOKUBAI CO. LTD.), and "EPOMIN P-1000" represents a polyethyleneimine-containing solution (manufactured by NIPPON SHOKUBAI CO., LTD.).

The adhesive optical films obtained in the examples and the comparative examples were evaluated as described below. The evaluation results are shown in Tables 2 and 3.

(Compatibility of Anchor Layer-Forming Coating Liquid)

The compatibility between the mixed solvent and the binder resin in the anchor layer-forming coating liquid obtained in each of the examples and the comparative examples was visually evaluated. The evaluation criteria were as follows.

⊙: No cloudiness or aggregate is observed, and a very good solution state is produced with no problem.
○: Cloudiness or aggregates are slightly observed, but a solution state is produced with no problem.
Δ: Cloudiness or aggregates are observed, but a solution state is produced with no problem.
x: Cloudiness or aggregates are seriously produced, and there is a problem with the production of the solution state.

(Crack Resistance)

The pressure-sensitive adhesive-type polarizing plates (420 mm long×320 mm wide) obtained in each of the examples and the comparative examples were bonded to both sides of a 0.7 mm-thick non-alkali glass plate in the crossed Nicols arrangement with a laminator. The resulting laminate was then autoclaved at 50° C. and 5 atm for 15 minutes so that they were completely bonded to the glass plate. After the resulting sample was stored under the conditions of 85° C. and 95° C., respectively, for 500 hours, the presence or absence of cracks was visually observed according to the criteria below. The evaluation criteria were as follows.

⊙: No crack occurs.
○: Fine cracks are slightly observed but do not affect visibility.
Δ: Fine cracks are observed in places but do not affect visibility.
x: Large cracks and fine cracks occur remarkably, which are not acceptable for practical purposes.

(Coating Appearance of Anchor Layer)

The anchor layer coating was formed in each of the examples and the comparative examples, and then the appearance of the coating was visually evaluated immediately after the coating was dried under predetermined conditions. The evaluation criteria were as follows.

⊙: The coating has a good appearance with no cissing or coating unevenness or no production of aggregates.
○: Minute cissing or coating unevenness is observed, but the coating has a good appearance at such a level that visibility is not affected.
Δ: Cissing or coating unevenness is observed, but the appearance of the coating is at such a level that visibility is not affected.
x: Cissing, coating unevenness, or aggregates occur significantly, which is not acceptable for practical purposes.

(Measurement of the Thickness of Anchor Layer)

Only the anchor layer was formed on the optical film in the process of preparing the adhesive optical film according to each of the examples and the comparative examples. The product was stained with an aqueous solution of 2% ruthenic acid for 2 minutes. The stained product was encapsulated with epoxy resin and then cut into about 80 nm-thick slices with an ultramicrotome (Ultracut S manufactured by Leica). Subsequently, the cross-section of the optical film slice was observed with a transmission electron microscope (TEM) (H-7650 manufactured by Hitachi, acceleration voltage: 100 kV), when the thickness of the anchor layer after the drying (the dry thickness (nm)) was determined.

(Evaluation of Adhesion Between Backing and Pressure-Sensitive Adhesive Layer (Adhesion))

The pressure-sensitive adhesive-type polarizing plate (420 mm long×320 mm wide) obtained in each of the examples and the comparative examples was bonded to a 0.7 mm-thick non-alkali glass plate with a laminator and then autoclaved at 50° C. and 5 atm for 15 minutes so that it was completely bonded to the glass plate (the initial stage). Subsequently, the polarizing plate was peeled off by hand from the non-alkali glass plate, when the adhesion was evaluated (reworkability was evaluated) according the following criteria.

⊙: The polarizing plate is successfully removed with no adhesive residue.
○: The polarizing plate is successfully removed although a slight adhesive residue is observed.
Δ: Adhesive residues are observed in places, but the polarizing plate is removable.
x: The adhesive remains over at least half of the glass surface.

TABLE 2

| | | Pressure-sensitive adhesive | | | Anchor layer forming conditions | | | |
| | | | (Coupling agent)/ | | Composition of anchor layer-forming coating liquid | | | |
| | Backing | Polymer solution | (parts by weight) | Dry treatment | Solvent | Solute | Base [%] | Compatibility |
| Example 1 | ZEONOR | A | KBM403/ 0.075 | Plasma | Water/IPA = 65/35 | Denatron P-521AC | 0.6 | ⊙ |
| Example 2 | ZEONOR | A | KBM403/ 0.075 | Plasma | Water/IPA = 80/20 | Denatron P-521AC | 0.6 | ⊙ |
| Example 3 | ZEONOR | A | KBM403/ 0.075 | Plasma | Water/IPA = 20/80 | Denatron P-521AC | 0.6 | ○ |
| Example 4 | ZEONOR | A | KBM403/ 0.075 | Plasma | Water/EA = 20/80 | Denatron P-521AC | 0.6 | ⊙ |
| Example 5 | ZEONOR | A | KBM403/ 0.075 | Plasma | Water/IPA = 65/35 | EPOMIN P-1000 | 0.2 | ⊙ |
| Example 6 | ZEONOR | A | KBM403/ 0.075 | Plasma | Water/IPA = 65/35 | EPOCROS WS-700 | 0.2 | ⊙ |
| Example 7 | ZEONOR | A | KBM403/ 0.075 | Plasma | Water/IPA = 65/35 | Denatron P-521AC | 0.6 | ⊙ |
| Example 8 | ZEONOR | A | KBM403/ 0.075 | Plasma | Water/IPA = 65/35 | Denatron P-521AC | 0.6 | ⊙ |
| Example 9 | ZEONOR | A | KBM403/ 0.075 | Plasma | Water/IPA = 65/35 | Denatron P-521AC | 0.6 | ⊙ |
| Example 10 | ZEONOR | A | KBM403/ 0.075 | Plasma | Water/IPA = 65/35 | Denatron P-521AC | 0.6 | ⊙ |
| Example 11 | ZEONOR | A | KBM403/ 0.075 | Plasma | Water/IPA = 65/35 | Denatron P-521AC | 0.6 | ⊙ |
| Example 12 | ZEONOR | A | KBM403/ 0.075 | Plasma | Water/IPA = 65/35 | Denatron P-521AC | 0.6 | ⊙ |
| Example 13 | ZEONOR | A | KBM403/ 0.075 | Plasma | Water/IPA = 65/35 | Denatron P-521AC | 0.6 | ⊙ |

TABLE 2-continued

| | | | | | | | | |
|---|---|---|---|---|---|---|---|---|
| Example 14 | ZEONOR | A | KBM403/ 0.075 | Plasma | Water/IPA = 65/35 | Denatron P-521AC | 0.6 | ⊙ |
| Example 15 | ZEONOR | A | KBM403/ 0.075 | Plasma | Water/IPA = 65/35 | Denatron P-521AC | 0.6 | ⊙ |
| Example 16 | ZEONOR | A | KBM403/ 0.075 | Plasma | Water/IPA = 65/35 | Denatron P-521AC | 0.6 | ⊙ |
| Example 17 | ZEONOR | A | KBM403/ 0.075 | Plasma | Water/IPA = 65/35 | Denatron P-521AC | 0.6 | ⊙ |
| Example 18 | ZEONOR | A | KBM403/ 0.075 | Plasma | Water/IPA = 65/35 | Denatron P-521AC | 0.6 | ⊙ |
| Example 19 | ZEONOR | A | KBM403/ 0.075 | Plasma | Water/IPA = 65/35 | Denatron P-521AC | 0.6 | ⊙ |
| Example 20 | ZEONOR | A | KBM403/ 0.075 | Plasma | Water/IPA = 65/35 | Denatron P-521AC | 0.6 | ⊙ |
| Example 21 | ZEONOR | A | KBM403/ 0.075 | Corona | Water/IPA = 65/35 | Denatron P-521AC | 0.6 | ⊙ |
| Example 22 | ARTON | A | KBM403/ 0.075 | Plasma | Water/IPA = 65/35 | Denatron P-521AC | 0.6 | ⊙ |
| Example 23 | Acryl | A | KBM403/ 0.075 | Plasma | Water/IPA = 65/35 | Denatron P-521AC | 0.6 | ⊙ |
| Example 24 | TAC | A | KBM403/ 0.075 | Plasma | Water/IPA = 65/35 | Denatron P-521AC | 0.6 | ⊙ |
| Example 25 | ZEONOR | A | KBM403/ 1 | Plasma | Water/IPA = 65/35 | Denatron P-521AC | 0.6 | ⊙ |
| Example 26 | ZEONOR | A | KBM403/ 2 | Plasma | Water/IPA= 65/35 | Denatron P-521AC | 0.6 | ⊙ |
| Example 27 | ZEONOR | A | KBM403/ 0.075 | Plasma | water/IPA/ ammonia = 65/35/0.1 | Denatron P-521AC | 4 | ⊙ |

| | Anchor layer forming conditions Drying conditions | | | | | | | Crack resistance | |
|---|---|---|---|---|---|---|---|---|---|
| | Coating thickness [μm] before drying | Drying temperature T [° C.] | Drying time H [s] | Time until the start of drying | Dry thickness [μm] | Coating quality (appearance) | Adhesion | 85° C. | 95° C. |
| | | | | T × H | | | | | |
| Example 1 | 12 | 50 | 25 | 1250 | 5 | 70 | ⊙ | ⊙ | ⊙ | ⊙ |
| Example 2 | 12 | 50 | 25 | 1250 | 5 | 70 | ○ | ⊙ | ⊙ | ⊙ |
| Example 3 | 12 | 50 | 25 | 1250 | 5 | 70 | ⊙ | ⊙ | ⊙ | ○ |
| Example 4 | 12 | 50 | 25 | 1250 | 5 | 70 | ○ | ⊙ | ⊙ | ○ |
| Example 5 | 12 | 50 | 25 | 1250 | 5 | 25 | ⊙ | ⊙ | ⊙ | ⊙ |
| Example 6 | 12 | 50 | 25 | 1250 | 5 | 25 | ⊙ | ⊙ | ⊙ | ⊙ |
| Example 7 | 5 | 50 | 25 | 1250 | 5 | 30 | ⊙ | ⊙ | ⊙ | ⊙ |
| Example 8 | 2 | 50 | 25 | 1250 | 5 | 10 | ⊙ | ○ | ⊙ | ⊙ |
| Example 9 | 17 | 50 | 25 | 1250 | 5 | 100 | ⊙ | ⊙ | ⊙ | ○ |
| Example 10 | 20 | 50 | 25 | 1250 | 5 | 120 | ⊙ | ○ | ○ | Δ |
| Example 11 | 12 | 50 | 25 | 1250 | 10 | 70 | ⊙ | ⊙ | ⊙ | ○ |
| Example 12 | 12 | 50 | 25 | 1250 | 18 | 70 | ⊙ | ⊙ | ⊙ | Δ |
| Example 13 | 12 | 50 | 80 | 4000 | 5 | 70 | ⊙ | ⊙ | ○ | Δ |
| Example 14 | 12 | 50 | 55 | 2750 | 5 | 70 | ⊙ | ⊙ | ⊙ | ○ |
| Example 15 | 12 | 50 | 35 | 1750 | 5 | 70 | ⊙ | ⊙ | ⊙ | ○ |
| Example 16 | 12 | 50 | 10 | 500 | 5 | 70 | ○ | ○ | ○ | ○ |
| Example 17 | 12 | 70 | 6 | 420 | 5 | 70 | ○ | ○ | ○ | ○ |
| Example 18 | 12 | 40 | 10 | 400 | 5 | 70 | Δ | ○ | ○ | Δ |
| Example 19 | 12 | 70 | 50 | 3500 | 5 | 70 | ⊙ | ⊙ | ○ | Δ |
| Example 20 | 12 | 40 | 100 | 4000 | 5 | 70 | ⊙ | ⊙ | ○ | Δ |
| Example 21 | 12 | 50 | 25 | 1250 | 5 | 70 | ⊙ | ○ | ⊙ | ⊙ |
| Example 22 | 12 | 50 | 25 | 1250 | 5 | 70 | ⊙ | ⊙ | ⊙ | ⊙ |
| Example 23 | 12 | 50 | 25 | 1250 | 5 | 70 | ⊙ | ⊙ | ⊙ | ⊙ |
| Example 24 | 12 | 50 | 25 | 1250 | 5 | 70 | ⊙ | ⊙ | ⊙ | ⊙ |
| Example 25 | 12 | 50 | 25 | 1250 | 5 | 70 | ⊙ | ⊙ | ⊙ | ○ |
| Example 26 | 12 | 50 | 25 | 1250 | 5 | 70 | ⊙ | ⊙ | ⊙ | Δ |
| Example 27 | 5 | 50 | 60 | 3000 | 5 | 200 | ⊙ | Δ | ○ | Δ |

TABLE 3

| | Pressure-sensitive adhesive | | | | Anchor layer forming conditions | | | |
|---|---|---|---|---|---|---|---|---|
| | Backing | Polymer solution | (Coupling agent)/ (parts by weight) | Dry treatment | Composition of anchor layer-forming coating liquid | | | |
| | | | | | Solvent | Solute | Base [%] | Compatibility |
| Comparative Example 1 | ZEONOR | A | KBM403/ 0.075 | Plasma | Water = 100 | Denatron P-521AC | 0.6 | ⊙ |

TABLE 3-continued

| | | | | | | | | |
|---|---|---|---|---|---|---|---|---|
| Comparative Example 2 | ZEONOR | A | KBM403/ 0.075 | Plasma | Water = 100 | Denatron P-521AC | 0.6 | ⊙ |
| Comparative Example 3 | ZEONOR | A | KBM403/ 0.075 | Plasma | IPA = 100 | Denatron P-521AC | 0.6 | X |
| Comparative Example 4 | ZEONOR | A | KBM403/ 0.075 | Plasma | EA = 100 | Denatron P-521AC | 0.6 | Δ |
| Comparative Example 5 | ZEONOR | A | KBM403/ 0.075 | Plasma | MA = 100 | Denatron P-521AC | 0.6 | Δ |
| Comparative Example 6 | ZEONOR | A | KBM403/ 0.075 | Plasma | Water/IPA = 65/35 | Denatron P-521AC | 0.6 | ⊙ |
| Comparative Example 7 | ARTON | A | KBM403/ 0.075 | Plasma | Water/IPA = 65/35 | Denatron P-521AC | 0.6 | ⊙ |
| Comparative Example 8 | ZEONOR | A | KBM403/ 0.075 | Plasma | Water/IPA = 65/35 | Denatron P-521AC | 0.6 | ⊙ |
| Comparative Example 9 | ZEONOR | A | KBM403/ 0.075 | Plasma | Water/IPA = 65/35 | Denatron P-521AC | 0.6 | ⊙ |
| Comparative Example 10 | ZEONOR | A | KBM403/ 0.075 | Plasma | Water/IPA = 65/35 | Denatron P-521AC | 0.6 | ⊙ |
| Comparative Example 11 | ZEONOR | A | KBM403/ 0.075 | Plasma | Water/IPA = 65/35 | Denatron P-521AC | 0.6 | ⊙ |
| Comparative Example 12 | ZEONOR | A | KBM403/ 0.075 | Plasma | Water/IPA = 65/35 | Denatron P-521AC | 0.6 | ⊙ |
| Comparative Example 13 | ZEONOR | A | KBM403/ 0.075 | Plasma | Water/IPA = 65/35 | Denatron P-521AC | 0.6 | ⊙ |
| Comparative Example 14 | ZEONOR | A | KBM403/ 0.075 | Plasma | Water/IPA = 65/35 | EPOMIN P-1000 | 0.2 | ⊙ |
| Comparative Example 15 | ZEONOR | A | KBM403/ 0.075 | Plasma | Water/IPA = 50/50 | Denatron P-521AC | 1 | ⊙ |
| Comparative Example 16 | ZEONOR | A | KBM403/ 0.075 | Plasma | Water/EA = 50/50 | EPOCROS WS-700 | 2 | ⊙ |

| | Anchor layer forming conditions Drying conditions | | | | | | | Crack resistance | |
|---|---|---|---|---|---|---|---|---|---|
| | Coating thickness [μm] before drying | Drying temperature T [°C.] | Drying time H [s] | Time until the start of drying | Dry thickness [μm] | Coating quality (appearance) | Adhesion | 85° C. | 95° C. |
| | | | | T × H | | | | | |
| Comparative Example 1 | 12 | 50 | 25 | 1250 | 5 | 70 | X | X | ⊙ | ⊙ |
| Comparative Example 2 | 12 | 50 | 60 | 3000 | 5 | 70 | X | X | ⊙ | ⊙ |
| Comparative Example 3 | 12 | 50 | 25 | 1250 | 5 | 70 | X | X | ⊙ | ○ |
| Comparative Example 4 | 12 | 50 | 25 | 1250 | 5 | 70 | Δ | Δ | ○ | ○ |
| Comparative Example 5 | 12 | 50 | 25 | 1250 | 5 | 70 | Δ | Δ | ○ | X |
| Comparative Example 6 | 28 | 50 | 25 | 1250 | 5 | 170 | ⊙ | Δ | ○ | X |
| Comparative Example 7 | 28 | 50 | 25 | 1250 | 5 | 170 | ⊙ | Δ | ○ | X |
| Comparative Example 8 | 12 | 50 | 25 | 1250 | 60 | 170 | Δ | ○ | ○ | X |
| Comparative Example 9 | 12 | 23 | 25 | 575 | 5 | 70 | Δ | ○ | Δ | X |
| Comparative Example 10 | 12 | 23 | 60 | 1380 | 5 | 70 | ○ | ○ | Δ | X |
| Comparative Example 11 | 12 | 50 | 5 | 250 | 5 | 70 | Δ | ⊙ | ○ | X |
| Comparative Example 12 | 12 | 50 | 135 | 6750 | 5 | 70 | ⊙ | ⊙ | ○ | X |
| Comparative Example 13 | 12 | 70 | 100 | 7000 | 5 | 70 | ⊙ | ⊙ | Δ | X |
| Comparative Example 14 | 12 | 23 | 60 | 1380 | 5 | 25 | ○ | ○ | Δ | X |
| Comparative Example 15 | 10 | 80 | 120 | 9600 | 5 | 100 | ⊙ | ⊙ | Δ | X |
| Comparative Example 16 | 9 | 40 | 120 | 4800 | 5 | 175 | ○ | ⊙ | ○ | X |

The invention claimed is:

1. A method for production of an adhesive optical film comprising an optical film, an anchor layer, and a pressure-sensitive adhesive layer placed on at least one side of the optical film with the anchor layer interposed therebetween, the method comprising the step of forming an anchor layer by applying an anchor layer-forming coating liquid to the optical film to form a coating with a thickness of 2 to 17 μm before drying, wherein the anchor layer-forming coating liquid contains a mixed solvent in which total content of water and an alcohol is 99% by weight or more, and a binder resin, and by drying the coating under drying conditions satisfying both of the following requirements:
(1) the drying temperature T is between 40° C. and 70° C.; and
(2) the value (T×H) obtained by multiplying the drying temperature T (° C.) by the drying time H (seconds) satisfies the relation $$500 \leq (T \times H) \leq 2{,}900$$

to remove the mixed solvent, and there is a time period of 10 seconds or less between applying the anchor layer-forming coating liquid to the optical film and starting the drying, a content of a silane coupling agent in the pressure-sensitive adhesive layer is from 0.075 to about 1 part by weight based on 100 parts by weight of a base polymer of the pressure-sensitive adhesive layer.

2. The method according to claim 1, wherein the alcohol is isopropyl alcohol and/or ethanol.

3. The method according to claim 1, wherein a surface of the optical film, on which the anchor layer is to be formed, is made of a norbornene resin or a (meth)acrylic resin.

4. The method according to claim 1, comprising the step of subjecting a surface of the optical film, on which the anchor layer is to be formed, to a corona treatment or a plasma treatment, before the step of forming the anchor layer.

5. The method according to claim 1, wherein an ammonia content is less than 0.03 parts by weight based on 100 parts by weight of the binder resin.

* * * * *